(12) United States Patent
Yu

(10) Patent No.: US 6,273,433 B1
(45) Date of Patent: Aug. 14, 2001

(54) SEAL WITH MAGNETIC COATING

(75) Inventor: Zuoxing Yu, Stratford (CA)

(73) Assignee: The Standard Products Company, Cleveland, OH (US)

( * ) Notice: Subject to any disclaimer, the term of this patent is extended or adjusted under 35 U.S.C. 154(b) by 0 days.

(21) Appl. No.: 09/255,430

(22) Filed: Feb. 22, 1999

(51) Int. Cl.⁷ ...................................... F16J 15/53
(52) U.S. Cl. .................. 277/629; 277/642; 277/645; 49/498.1; 49/490.1
(58) Field of Search .................. 49/498.1, 490.1; 277/629, 642, 645, 906, 921; 312/296

(56) References Cited

U.S. PATENT DOCUMENTS

| | | | |
|---|---|---|---|
| 2,959,832 | * 11/1960 | Baermann | 277/921 X |
| 3,362,108 | 1/1968 | Jones . | |
| 4,240,228 | * 12/1980 | Okamura | 277/921 X |
| 4,294,485 | 10/1981 | Engelhard . | |
| 4,469,383 | 9/1984 | Losert . | |
| 4,535,563 | 8/1985 | Mesnel . | |
| 4,592,180 | 6/1986 | Gerritsen . | |
| 4,644,698 | 2/1987 | Gerdes et al. . | |
| 4,653,819 | 3/1987 | Swerbinsky . | |
| 4,753,042 | 6/1988 | Adkins . | |
| 4,832,396 | 5/1989 | Moreno et al. . | |
| 4,882,821 | 11/1989 | Sims, Jr. . | |
| 4,999,951 | 3/1991 | Keys et al. . | |
| 5,077,948 | 1/1992 | Olson et al. . | |
| 5,161,346 | 11/1992 | Olson et al. . | |
| 5,257,791 | * 11/1993 | Cittadini et al. | 277/629 |
| 5,367,831 | 11/1994 | Gunkel . | |
| 5,575,485 | 11/1996 | Merla et al. . | |
| 5,606,828 | 3/1997 | Hall et al. . | |
| 5,634,644 | * 6/1997 | Guillon | 277/645 X |

* cited by examiner

Primary Examiner—Robert J. Sandy
Assistant Examiner—Karlena D. Schwing
(74) Attorney, Agent, or Firm—Fay, Sharpe, Fagan, Minnich & McKee, LLP

(57) ABSTRACT

A thin layer of a magnetizable coating is extruded or coextruded onto a external surface portion of a tubular sponge bulb seal for an automotive door or hatch. The coating is of a thickness, location on the seal and formulation to be selectively magnetized to provide a desired magnetic force level to optimize the balance between effective sealing and ease of door opening.

10 Claims, 1 Drawing Sheet

SEAL WITH MAGNETIC COATING

BACKGROUND OF THE INVENTION

The present invention relates generally to seals for doors or hatches of automotive vehicles. More particularly, the present invention relates to a sponge bulb tubular seal for a door or hatch of an automotive vehicle wherein the tubular seal has a magnetic coating for enhanced sealing contact with an associated metal frame surface.

The conventional primary door or hatch seal for an automotive vehicle consists of a co-extruded dense carrier which carries a sponge bulb tubular seal.

The carrier functions to secure the sponge seal to a door or hatch flange and the sponge bulb tubular seal is positioned in compression between adjacent surfaces of the door or hatch and the associated automotive frame when the door or hatch is closed. This type of seal has been in use for many years and usually functions in a satisfactory manner. However, under some conditions a conventional seal may not provide an adequate sealing function. For example, at high speeds air pressure may exceed the maximum sealing force provided by the sponge bulb and cause a failure of the sealing function. Therefore, there remains room for improvement in such seals.

Magnetic elements have been employed in the past in conjunction with seals especially in conjunction with refrigerator seals. Magnetic elements are commonly used in seals for refrigerators such as is disclosed in U.S. Pat. No. 4,469,383 Sep. 4, 1984 to Losert for "Refrigerator Cabinet and Method of Construction", U.S. Pat. No. 4,644,698 Feb. 24, 1987 to Gerdes et al. for "Refrigerator and Method of Gasket Assembly Construction and U.S. Pat. No. 4,653,819 Mar. 31, 1987 to Swerbinsky for "Refrigerator Cabinet and Gasket Construction". In the automotive field, U.S. Pat. No. 4,999,951 Mar. 19, 1991 to Keys et al. discloses a magnetic window assembly for frameless and full flush window systems of automotive vehicles which comprises a flexible sealing strip having a compressible body portion with a first magnetic element embedded therein. Also, U.S. Pat. No. 5,367,831 Nov. 29, 1994 to Gunkel discloses a magnetic header seal assembly for an automotive vehicle which includes an integrally attached magnetic element. U.S. Pat. No. 5,575,485 Nov. 19, 1996 to Meria and U.S. Pat. No. 5,257,791 Nov. 2, 1993 to (Cittadimi) relate to a magnetic gaskets for automobiles which gaskets are said to be suitable for forming a seal in regions of curviliniear extension and which include a magnetized bar or insert. There are also known patents for gaskets or seals for doors for building structures. For example, U.S. Pat. No. 4,753,042 Jun. 28, 1988 to Adkins; U.S. Pat. No. 5,077,948 Jan. 7, 1992 to Olson et al.; U.S. Pat. No. 5,606,828 Mar. 4, 1997 to Hall et al.; and No. 5,161,346 Nov. 10,1992 to Olson et al. Each of the above patents is specifically incorporated by reference herein.

Although several patents are known to use magnetic force in combination with a seal or gasket, the present invention provides a novel improvement wherein a thin, elastomeric magnetic coating is provided on an automotive seal. Further understanding of the present invention will be had from the following disclosure and claims taken in conjunction with the accompanying drawing.

SUMMARY OF THE INVENTION

In accordance with the present invention a thin layer of a magnetizable coating is extruded or coextruded onto a external surface portion of a tubular sponge bulb seal for an automotive door or hatch. The coating is of a thickness, location on the seal and formulation to be selectively magnetized to provide a desired magnetic force level to optimize the balance between effective sealing and ease of door opening.

DETAILED DESCRIPTION OF THE PREFERRED EMBODIMENT

Figure 1:
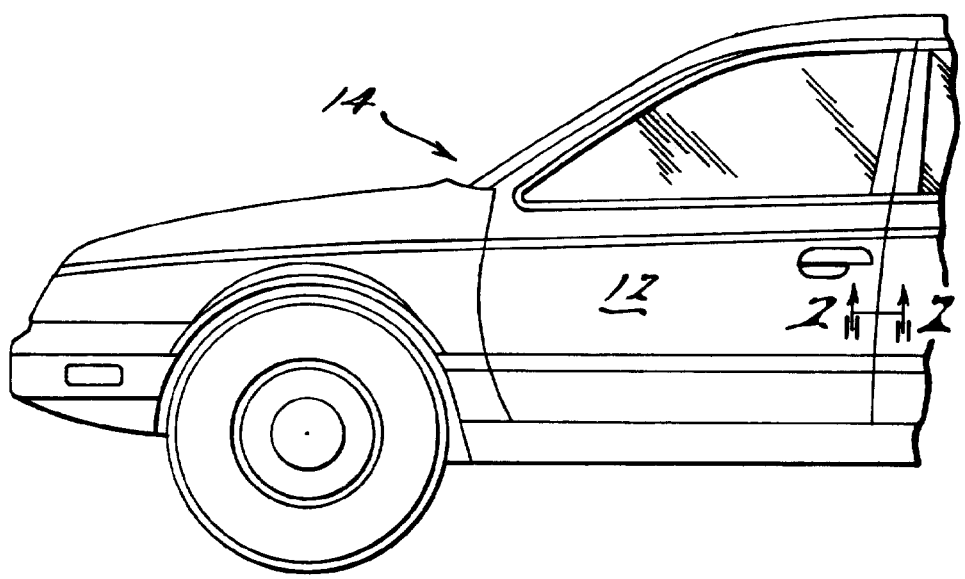
FIG. 1a side elevation of an automotive vehicle having a door sealed by a preferred embodiment of the present invention.
Figure 2:
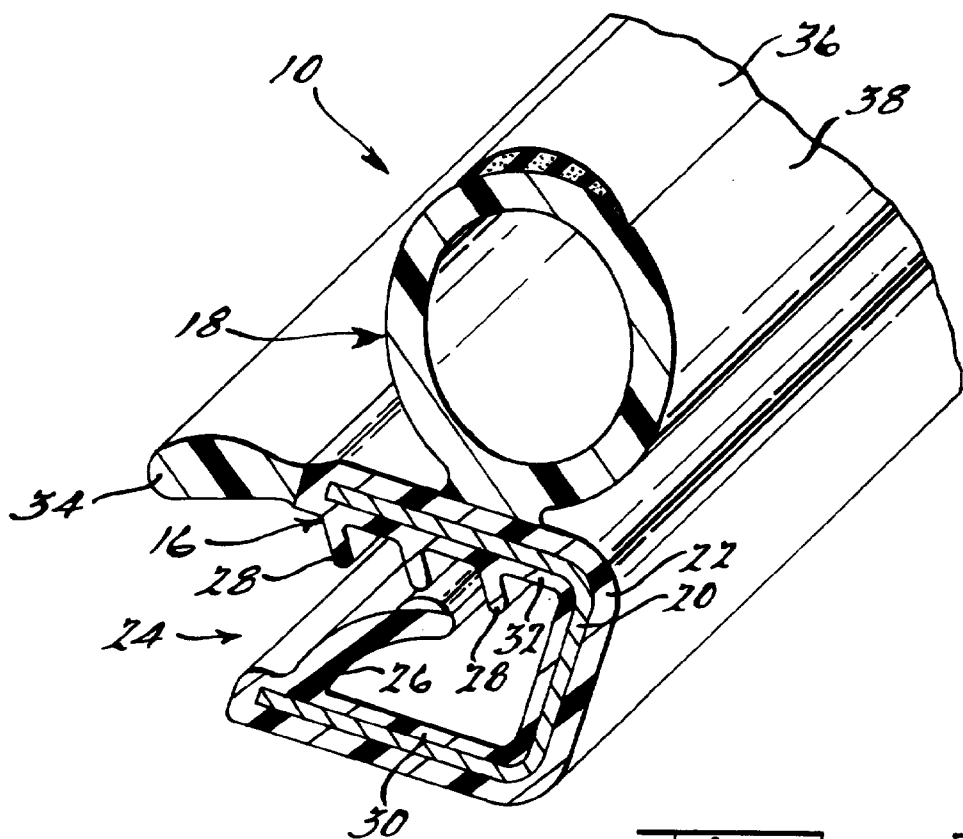
FIG. 2 is a cross-sectional view taken along line 2—2 in FIG. 1, in perspective and broken away, showing a preferred embodiment of a seal with magnetic coating of the present invention.

Now referring to the Figures, a preferred embodiment of a door seal of the present invention is shown and indicated generally by the numeral 10. Door seal 10 is shown in sealing relationship about door 12 of an automotive vehicle which is indicated generally by numeral 14. Door seal 10 is preferably used to seal around the periphery of a door or hatch opening of an automotive vehicle as is illustrated herein. However, door seal 10 can be adapted for and is suitable for other similar uses as are common for tubular seals of its type. To impart a clear understanding of the present invention, the description of door seal 10 will be set forth herein in the context of its use in an automotive vehicle environment which is its preferred use.

Door seal 10 broadly comprises a U-shaped (in cross-section) carrier 16 and a tubular sealing element 18. Carrier 16 has a metal core 20 with elastomeric cover 22 extruded thereover as is conventional in the art. Suitable materials for cover 22 include EPDM rubber. The U-shape of carrier 16 provides an open-mouth channel opening indicated at 24 into which an associated flange extends when carrier 16 is secured thereon. Ribs 26 and 28 extend from legs 30 and 32 of carrier 16 to securely retain carrier 16 onto an associated flange. Carrier 16 can also carry additional sealing elements as is illustrated in the figure as sealing lip 34. Carrier 16 serves the function of attaching or securing door seal 10 to a perimeter flange about a door or hatch opening of a vehicle and is thus means for attaching door seal 10 to an associated automotive vehicle. Carrier 16 can be of any suitable construction so long as it serves its purpose of attaching door seal 10.

Tubular sealing element 18 is preferably extruded from sponge rubber such as sponge EPDM rubber and can be coextruded with carrier 16 in a conventional manner so that sealing element 18 heat bonds to carrier 16.

As thus far described, carrier 16 and tubular sealing element 18 are entirely conventional and would function as a satisfactory automotive seal under all but the more challenging sealing situations. It is to the more challenging situations, however, that the present invention is directed. In accordance with the present invention, a substantial improvement in sealing is obtained by provision of a thin magnetic coating 36 onto a portion of the exterior surface 38 of sealing element 18. Magnetic coating 36 covers a selectively limited surface area of sealing element 18 and is selectively thin so that magnetic coating 36 will provide an attraction to an associated metallic surface to be sealed thereby but such attraction will be limited so that the force of attraction can be easily overcome to open the door 12. The magnetic force is from 0.5 gf/cm$^2$ to 43.85 gf/cm$^2$, preferably from 1.1 gf/cm² to 4.5 gf/cm² and most preferably about 2.08 gf/cm².

Magnetic coating 36 is formulated by incorporating a magnetizable ferromagnetic powder such as barium or strontium type ferromagnetic powder into an elastomeric material such as EPDM in a mixer or blending apparatus to form an extrudable rubber compound. EPDM or similar rubber compound can comprise a broad range of ferromagnetic powder, for example, from about 15% to about 90% powder by weight. The rubber compound can then be applied to the selected exterior surface of sealing element 18 by alternative methods. For example, where sealing element 18 has already been made, the magnetizable compound can be extruded directly onto the surface of element 18 to which it will heat bond and thereafter the seal 10 can be passed through an in-line magnetizer to magnetize the rubber compound. Alternatively, cover 22 of carrier 16, sealing element 18 and the magnetizable compound can be triple-extruded together and then passed through the magnetizer. The magnetic force of coating to automotive body should be optimized to provide balance between effective sealing and ease of door opening. Such a balance can be achieved by selectively optimizing the coating formulation.

While a preferred embodiment of the present invention has been described in conjunction with its preferred use in the automotive environment, it will be appreciated that the invention has other uses and variations and modifications within the broad scope thereof and therefore it is intended that the present invention is to be limited only by the following claims.

What is claimed is:

1. A method of making a magnetic seal for an automotive vehicle comprising the steps of:

(a) extruding an elastomeric sealing element having a generally U-shaped carrier for securement onto a flange and a tubular sealing element;

(b) extruding onto a minor, limited surface area of said element, a thin layer of an elastomeric material having a magnetizable material dispersed throughout the thin layer; and (c) magnetizing said thin layer.

2. The method of claim 1 wherein said sealing element comprises sponge rubber.

3. The method of claim 1 wherein said thin layer has a magnetic force ranging from 0.5 gf/cm² to 43.85 gf/cm².

4. In combination with an automotive vehicle, a magnetic seal for sealing engagement against a metal surface of said vehicle, said seal having a carrier which secures said seal onto a flange of the vehicle and an elastomeric sealing element with an exterior surface intended to be juxtaposed against said vehicle metal surface and a thin layer of magnetic rubber extruded onto a minor portion of said exterior surface.

5. The combination of claim 4 wherein said sealing element comprises sponge rubber.

6. The combination of claim 4 where said thin layer of magnetic rubber has a magnetic force ranging from about 0.5 gf/cm² to 43.85 gf/cm².

7. A magnetic seal for sealing engagement against a ferromagnetic surface, said seal having an elastomeric sealing element with an exterior surface intended to be juxtaposed against the ferromagnetic surface, a carrier for securement onto an associated mounting surface, and a thin layer of magnetic rubber extruded onto a minor, limited surface area of said exterior surface.

8. The magnetic seal of claim 7 wherein said carrier is U-shaped in cross-section.

9. The magnetic seal of claim 7 wherein said sealing element comprises sponge rubber.

10. The magnetic seal of claim 7 wherein said thin layer of magnetic rubber has a magnetic force ranging from about 0.5 gf/cm² to 43.85 gf/cm².

* * * * *

UNITED STATES PATENT AND TRADEMARK OFFICE
CERTIFICATE OF CORRECTION

| | |
|---|---|
| PATENT NO. | : 6,273,433 B1 |
| DATED | : August 14, 2001 |
| INVENTOR(S) | : Zuoxing Yu |

Page 1 of 1

It is certified that error appears in the above-identified patent and that said Letters Patent is hereby corrected as shown below:

<u>Column 4, claim 1,</u>
Line 2, insert -- tubular sealing -- before the word "element".

Signed and Sealed this

Twelfth Day of March, 2002

*Attest:*

*Attesting Officer*

JAMES E. ROGAN
*Director of the United States Patent and Trademark Office*